United States Patent

[11] 3,579,214

[72] Inventor Erik R. Solyst
San Jose, Calif.
[21] Appl. No. 737,759
[22] Filed June 17, 1968
[45] Patented May 18, 1971
[73] Assignee International Business Machines Corporation
Armonk, N.Y.

[54] MULTICHANNEL MAGNETIC HEAD WITH COMMON LEG
1 Claim, 10 Drawing Figs.

[52] U.S. Cl. .......... 340/174.1F, 29/603, 179/100.2C
[51] Int. Cl. .......... G11b 5/28
[50] Field of Search .......... 340/174 (1E), (F); 179/100.2 (C), (MI), (P); 346/74 (MC)

[56] References Cited
UNITED STATES PATENTS

| | | | |
|---|---|---|---|
| 3,458,926 | 8/1969 | Maissel et al. | 179/100.2 |
| 3,502,821 | 3/1970 | Duinker | 340/174.1 |
| 2,785,038 | 3/1957 | Ferber | 179/100.2 |
| 2,848,556 | 8/1958 | Roys et al. | 179/100.2 |
| 2,987,582 | 6/1961 | Naiman | 340/174.1 |
| 3,156,919 | 11/1964 | Rutter | 340/174.1 |
| 3,164,682 | 1/1965 | Anderson | 340/174.1 |
| 3,292,169 | 12/1966 | D'Alessandro et al. | 340/174.1 |

*Primary Examiner*—Bernard Konick
*Assistant Examiner*—Vincent P. Canney
*Attorneys*—Hanifin and Jancin and Nathan N. Kallman

ABSTRACT: A read-write head assembly incorporates multiple transducing elements in an integral ferromagnetic structure, all elements being jointed to a common ferromagnetic leg to complete the magnetic circuit. The common leg serves as an air bearing slider for noncontact recording.

*INVENTOR.*
ERIK R. SOLYST

*BY* Nathan N. Kallman
ATTORNEY

MULTICHANNEL MAGNETIC HEAD WITH COMMON LEG

BACKGROUND OF THE INVENTION

1. Field of the Invention

This invention relates to a novel and improved multigap magnetic head assembly, and in particular to a simplified multielement ferrite head assembly useful for noncontact recording in a magnetic disc file.

2. Description of the Prior Art

In storage systems, such as magnetic disc, drum or tape systems, which employ a multiplicity of tracks for recording or reproducing information signals, a common approach is to position a like multiplicity of magnetic transducers or elements in fixed relation to the record tracks. Storage systems of this type, particularly magnetic disc files, are generally designated as fixed head files, in contrast to those systems that employ movable head assemblies for traversing a recording surface to different selected tracks.

Some multielement magnetic head assemblies used in fixed head files are made by constructing individual elements and joining the separate elements by inserting and potting the elements in a common housing. In such case, there are problems of proper joinder, alignment and stability of all of the elements, among other things. If the head assembly is to be used for high density, high resolution recording, then variations in gap height or throat height, or in element width and spacing will adversely affect the operation of the head assembly and its associated system. Also, differences in material used for head assembly, as well as the configuration of the head may cause dimensional instability, with resultant low yield or low quality of the finished product.

Another known technique teaches the use of an integral structure of ferromagnetic material, such as a ferrite block, which is processed to provide the desired number of transducing elements. Since ferrite is brittle, a material such as glass is used within the gap to mechanically join the opposing walls or poles of the gap structure, and to protect the gap structure from erosion and wear. However, to achieve such known structures, several parts must be precisely shaped and assembled, or else the above-mentioned problems appear. Variations in dimensions among the elements and their magnetic circuits will vary the reluctances of the magnetic circuits. Thus, the amplitudes of the output signals from each channel associated with the respective transducing elements will be different in response to the same signal, which is undesirable. These problems of misalignment, nonuniformity and dimensional instability need to be overcome in order to utilize a multigap head assembly successfully.

SUMMARY OF THE INVENTION

An object of this invention is to provide a novel and improved multigap magnetic head assembly.

Another object of this invention is to provide a multielement magnetic head assembly using a minimal number of structural parts.

Another object is to provide a multielement magnetic head assembly wherein the critical dimensions are virtually stable, thereby affording optimum reliability.

Another object is to provide a multielement magnetic head assembly wherein the gap height of each of the transducing gaps are predetermined and substantially the same.

According to this invention, a multielement magnetic head assembly is formed from two basic ferromagnetic blocks, one block encompassing several transducing elements, and the other block serving as a common leg to complete a multiplicity of magnetic circuits, each associated with another element. The first block is machined and shaped to provide substantially similar and parallel core sections, including windows for coil winding. Each core and its window are so shaped that gap height and rear gap dimensions are easily controlled, and visible for processing. The common leg structure is joined to all the cores to complete the magnetic circuit for each transducing element, and has an air bearing surface useful for noncontact recording.

BRIEF DESCRIPTION OF THE DRAWINGS

The foregoing and other objects, features and advantages of the invention will be apparent from the following more particular description of a preferred embodiment of the invention, as illustrated in the accompanying drawings in which: illustrated

Similar numerals refer to similar elements throughout the drawing.

DESCRIPTION OF THE PREFERRED EMBODIMENT

Figure 1A:
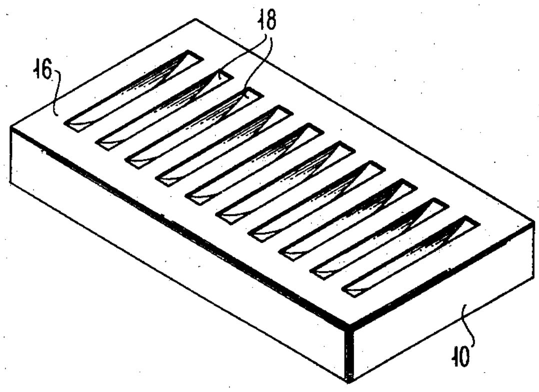
FIGS. 1*a—f* are illustrations of the manufacture and assembly of a multiple gap head, in accordance with this invention.
Figure 1B:
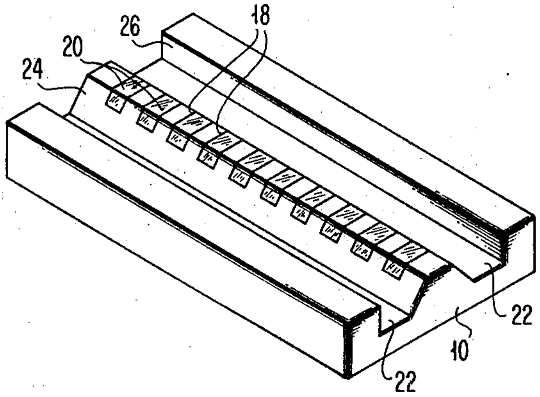
Figure 1C:
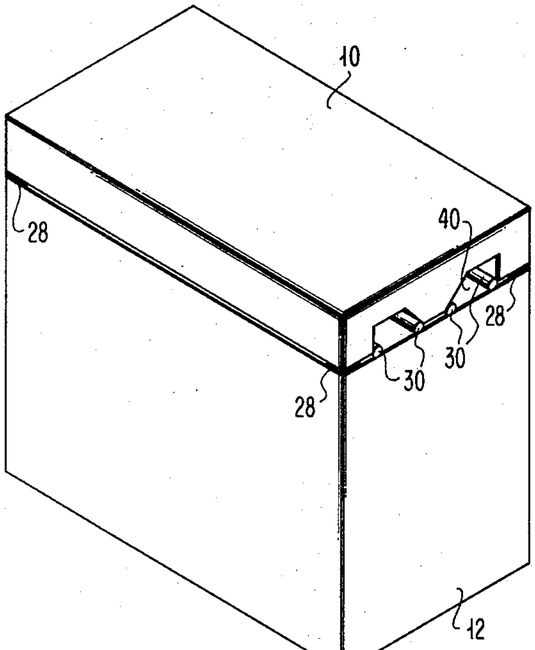
Figure 1D:
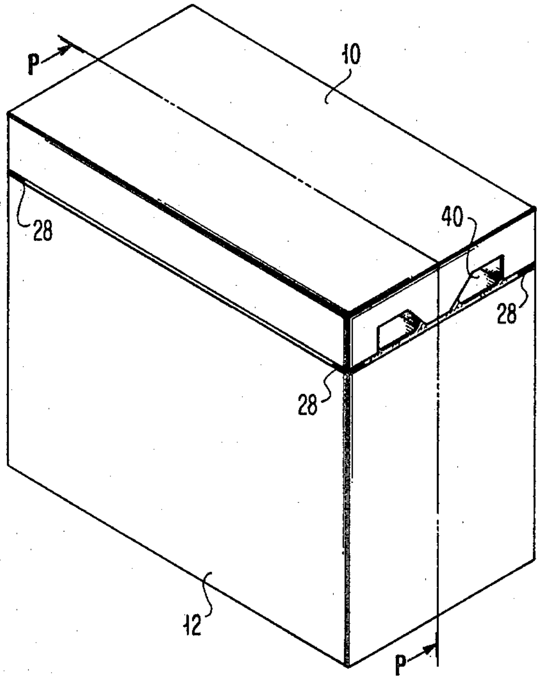
Figures 1E, 1F, 1G, 2, 3, 4:
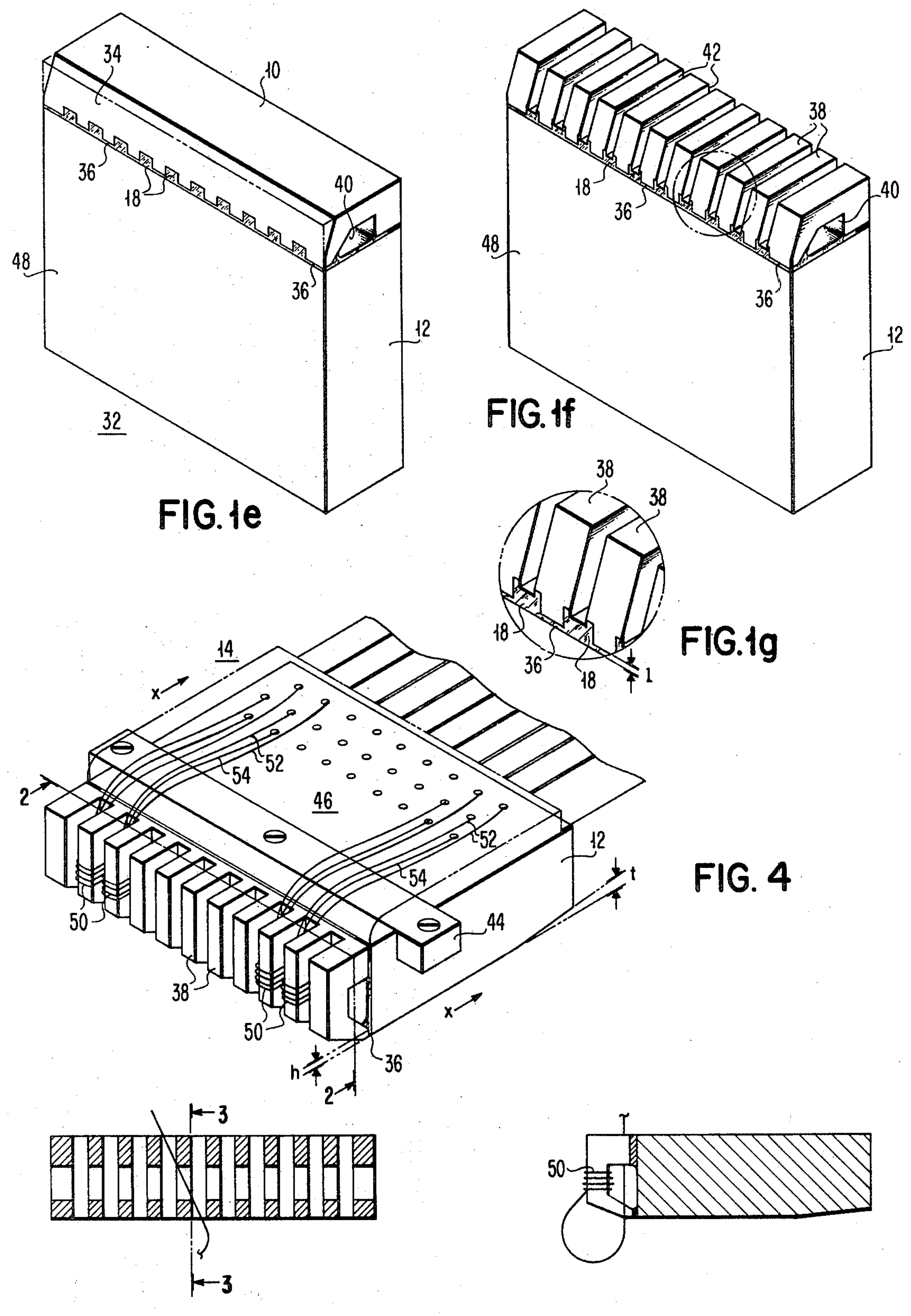
FIG. 1*g* is an enlarged fragmentary view of the bonding between the transducer element and the common leg as illustrated in FIG. 1*f*.
FIGS. 2 and 3 depict the coil winding operation.
FIG. 4 is an isometric view of a head assembly, made according to this invention showing the coils wound only to some of the elements.

With reference to FIGS. 1*a—f*, two ferrite blocks 10 and 12 are employed for the manufacture of two similar multigap head assemblies 14, one being represented in FIG. 4. Cylindrical segments are cut at one surface 16 of the block 10, the cylindrical slots 18 being substantially parallel and of the same dimensions. The slots 18 are filled with a molten glass 20, which has a coefficient of thermal expansion closely matched to that of the ferrite.

The surface 16 is then ground and polished, and two longitudinal channels 22 are shaped transversely to the slots 18. Each channel 22 has an angular wall 24 adjacent to the remaining portions of the glass filled slots 18, the angle being determinative of the gap throat height ($h$), which is the height of the transducing gap measured from the plane that scans the magnetic medium during the record or readout modes, as illustrated in FIG. 4. The opposing wall 26 of the channel 22 is substantially perpendicular to the bottom or base of the channel 22.

As shown in FIG. 1*c*, the shaped block 10 is positioned on the rectangular block 12, each block having the same length and width. Spacer shims 28, made of platinum for example, are set at the corners of the assembly. between the two blocks 10 and 12. The thickness of these spacer shims 28 defines gap length ($l$), indicated in the encircled expanded sectional view of FIG. 1*f*. The platinum material used for the gap-defining shims has a coefficient of expansion substantially close to that of the ferrite and glass materials used in the manufacture of the head assembly.

Four glass rods 30 are placed within the two channels 22, the composition of the rods 30 being preferably the same as that of the glass 20 used to fill the cylindrical cutouts 18. The assembly is heated to a temperature, approximately 750° C. by way of example, to melt the glass rods 30, and the molten glass flows into the open areas between the two spaced blocks 10 and 12. The molten glass fills the spaces formed by the shims 28, including the areas intended to form the nonmagnetic transducing gaps. The glass 20 in the slots 18 also becomes molten, but the degree of liquidity of this glass at the melting temperature is not sufficient to overcome the surface tension existing within the slots 18. Therefore, the glass material 20 in the slots 18 does not experience any appreciable flow and remains therein.

When the glass hardens and sets, the assembly is sliced in half along the plane (P–P) represented by the dash lines in FIG. 1*d*, to provide two like sections 32, as in FIG. 1*e*. The block portion 10 of the section 32 is beveled along the surface 34 adjacent to the glass filled transducing gaps 36. Thereafter, the beveled surface 34 is slotted (see FIG. 1*f*) at uniformly spaced intervals to form core elements 38, each core including a window or aperture 40. The parallel slots 42 are formed to extend into the glass filled slots 18 to a predetermined depth, but do not project into the back gap area of the core elements 38.

As illustrated in FIG. 4, a suspension mounting bar 44 is fastened in a groove, that has been machined in the top surface 46 of the slider block 12, so that the head assembly 14 may be mounted to a flexure (not shown) of a head support assembly. A tapered portion ($t$) is formed across a portion of the bottom surface 48, to achieve an air bearing effect during transducing operation.

To complete the assembly, an electrical coil 50 is wound around each core element 38 through the associated window 40, as illustrated in FIGS. 2 and 3, only some of the coils 50 being shown in FIG. 4. Each coil 50 has two terminal leads 52 and a center tap lead 54 to afford recording and differential readout. The leads are joined to a diode matrix which, in turn, is connected to the read-write circuitry of the storage system. The coils 50 are electromagnetically coupled to respective magnetic circuits established by the core elements 38 and the slider block 12, which is common to all the cores 38.

When used in a gliding head assembly of a magnetic disc file, the wired head assembly 14 is mounted to a flexure of a head support or arm. In operation, the head assembly 14 flies over a moving storage medium, such as a rotating magnetic disc. Each core element 38 and its transducing gap 36 are in transducing relation with respective concentric record tracks, which move across the fixed head assembly and the lengths of the gaps 36 in the direction indicated by the arrows ($x$) in FIG. 4.

Various advantages and features are available by virtue of the novel head assembly disclosed herein. For example, the individual coils and associated transducing elements may be separately energized, concurrently or at different times. In operation, the head assembly is mounted with reference to a magnetic disc surface, so that each transducing element relates to a separate record track. By using the construction of this invention, an efficient magnetic circuit is realized, since the use of a common leg allows a relatively large rear gap area with low rear gap reluctance, and thus low core reluctance. Also, since core element thickness is independent of gap width, a wider core element may be used with increased rigidity and mechanical strength. Furthermore, the gap is formed during the last potting operation, and as there is no subsequent potting, gap dimensions once established are not altered. In addition, the open window in each core element facilitates coil winding. It is apparent that the head assembly of this invention is simple and relatively inexpensive to manufacture, yet affords dimensional stability and reliability, inter alia. As a result, the disclosed fabrication process allows a high yield at low cost, with a resultant high performance multielement record head assembly.

While the invention has been particularly shown and described with reference to a preferred embodiment thereof, it will be understood by those skilled in the art that the foregoing and other changes in form and details may be made therein without departing from the spirit and scope of the invention.

I claim:

1. A multielement magnetic head assembly for use in noncontact magnetic recording comprising:

a ferrite block for use as a common leg in said multielement magnetic head assembly having a front face and having a bottom surface that is shaped to define a substantial portion of an air-bearing surface, a multiplicity of C-shaped transducer core elements formed in an integral structure and having a common top leg, each of said elements having a bottom leg, each of aid bottom legs having a pole tip indented on sides adjacent to adjacent ones of said elements, the bottom surfaces of all said elements acting as a portion of said air-bearing surface, a first continuous glass layer between said common top leg and said block face for bonding said common top leg to said face for forming a common rear gap, and a second continuous glass layer disposed between said C-core elements and said block face for bonding each said bottom leg to said face for forming the transducing gaps of said magnetic heads, and disposed between adjacent ones of said C-shaped core elements in said indentations for bonding said adjacent C-core elements together, thus providing strength to said magnetic head assembly structure.